Patented Aug. 1, 1933

1,920,851

UNITED STATES PATENT OFFICE 1,920,851

PROCESS FOR PRODUCING FORMATES OF ALKALINE EARTH METALS

Egon Elöd, Karlsruhe, and Max Enderli, Oestrich, Germany, assignors to the Firm of Rudolph Koepp & Co., Oestrich, Germany, a Society of Germany No Drawing. Application November 25, 1930, Serial No. 498,200, and in Germany March 14, 1925

15 Claims. (Cl. 260—114)

This invention relates to the production of alkaline earth metal formates, including magnesium formate. The processes heretofore known for preparing formates of the alkaline earth metals, more particularly calcium formate, depend upon the action of carbon monoxide on dry alkaline earth metal hydroxides or on alkaline earth metal hydroxides in presence of water.

It has been found that the sluggish reaction between alkaline earths, e. g. quick lime, and carbon monoxide may be accelerated to an extraordinary extent if care is taken to ensure the presence of substances which promote the reaction. According to this invention alkali metal formates are used as substances which favour the reaction.

Up to 30 parts by weight of alkali formate may be added to 100 parts by weight of alkaline earth metal hydroxide; preferably about 10–20 parts of alkali formate are employed with 100 parts by weight of alkaline earth metal hydroxide. It is also possible to make do, however, with smaller quantities of formate, e. g. down to 5% and less.

The alkali formates may be added to the reaction mixture direct or they may be produced in the reaction mixture itself. Thus, for example, on addition of caustic alkalies, alkali formates are produced first of all by the action of the carbon monoxide; these formates then act in a reaction-accelerating manner on the progress of the formation of the alkaline earth formates. It is possible that the caustic alkalies also themselves exert a reaction-accelerating influence on the formation of the alkaline earth formates.

Up to 20 parts by weight of caustic alkali may, for example, be employed with 100 parts by weight of alkaline earth hydroxide. In general 5–15 parts by weight are sufficient. However, good results may also be produced by employing smaller quantities.

Besides caustic alkalies numerous other substances may also be used; quite generally such substances may be used which, binding carbon monoxide, either directly or owing to the presence of alkaline earths, are capable of forming alkali formates.

The following may be mentioned as examples of such substances; alkali phenolates, alkali acetates, alkali oleates, alkali chromates, alkali carbonates, alkali sulphides, alkali sulphates, alkali alcoholates, alkali ferrocyanides, alkali borates, and the like.

In general it has been found that potassium salts act better than sodium salts.

The alkaline earth metal hydroxide may be employed either as an aqueous suspension or in the form of a mash; however, it may also be successfully worked up in the form of powder.

The effect of the reaction-accelerating additions is apparent from the following comparative examples:

*Example 1.*—500 litres of a 15% milk of lime were treated while being thoroughly mixed with carbon monoxide at 180° and of 4 atms. pressure. 90 minutes were necessary for practically complete conversion.

*Example 2.*—500 litres of a 15% milk of lime were mixed with 20 kg. of sodium formate and 50 kg. of calcium formate and then treated with carbon monoxide exactly as described in Example 1. In this case only 50 minutes were necessary, that is, little more than half of the time taken in the first experiment.

When working in aqueous suspensions it is advantageous to proceed in such a way that alkaline earth metal formate (calcium formate in the case of experiment 2) is added in such a quantity that the process takes place in presence of a saturated calcium formate solution. In this way, besides acceleration of the reaction, the further advantage is obtained that the calcium formate which forms is produced at the same time as a solid, which permits of ready separation from the solution, e. g. by filtration.

The mother liquor may then be led back into the process again.

When working alkaline earth metal hydroxide in the powder form the acceleration of the reaction to be produced in accordance with the invention is apparent to a particularly striking extent. In this case the alkali earth metal hydroxide is preferably used in the form of a loose powder, such as may be obtained, for example, by slaking burnt lime in a current of steam. In this way the heat of hydration which appears during the slaking may advantageously be utilized for the reaction with carbon monoxide. Further, it has been found to be advantageous to carry out the treatment of solid, preferably finely powdered, alkali earth metal hydroxide with the coaction of small quantities of moisture, supplied, for example, in the form of water vapour.

The following comparative examples show the progressive effects which are produced by working up solid alkaline earth hydroxide with the assistance of the catalysts claimed:

*Example 3.*—100 kg. of calcium hydroxide powder, prepared by slaking burnt lime with water vapour having a moisture content of 15%, were subjected at 180° to the action of carbon monoxide under a pressure of 35 atms. care being taken to ensure thorough mixing of gas and calcium hydroxide at the same time. After 2½ hours only 8% of calcium formate were formed.

*Example 4.*—100 kg. of the calcium hydroxide powder worked up as in Example 3, were mixed with 15 kg. of sodium formate and the mixture treated as described in Example 3. After 2½ hours practically all the calcium hydroxide (95%) was converted into calcium formate.

*Example 5.*—100 kg. of the calcium hydroxide worked up as in Example 3 were mixed with 6 kg. of caustic potash and the mixture treated with carbon monoxide as described in Examples 3 and 4. The conversion of calcium hydroxide into calcium formate was complete before the expiration of two hours.

*Example 6.*—100 kg. of calcium hydroxide powder, prepared according to Example 3 by slaking burnt lime with water vapour having a moisture content of 15%, are mixed with 30 kg. of potassium ferrocyanide and subjected to the action of carbon monoxide at a temperature of 180° and under a pressure of 35 atms., care being taken to ensure thorough mixing of the gas and calcium hydroxide at the same time. After 2½ hours 60% of the caustic lime present was converted into calcium formate.

Magnesium hydroxide also may be subjected to the reaction for forming formates with the assistance of reaction accelerators in accordance with the invention:

What we claim is:

1. A method of producing formates of the alkaline earth metals consisting in causing a gas which comprises carbon monoxide to act on 100 parts by weight of alkaline earth metal hydroxide at formate producing temperatures and pressures in presence of not more than 30 parts by weight of a catalyst consisting of at least one alkali metal formate.

2. A method of producing formates of the alkaline earth metals consisting in causing a gas which comprises carbon monoxide to act on an alkaline earth metal hydroxide at formate producing temperatures and pressures in presence of a catalyst consisting of at least one alkali metal formate, said catalyst being produced in situ, the approximate proportions by weight being 100 parts of said hydroxide to not more than 30 parts of alkali metal formate.

3. A method of producing formates of the alkaline earth metals consisting in causing a gas which comprises carbon monoxide to act on an alkaline earth metal hydroxide at formate producing temperatures and pressures in presence of a catalyst consisting of at least one alkali metal formate, said catalyst being produced in situ by having present chemicals which are adapted to combine with carbon monoxide with formation of at least one alkali metal formate, the approximate proportions by weight being 100 parts of said hydroxide to not more than 30 parts of alkali metal formate.

4. A method of producing calcium formate consisting in causing a gas which comprises carbon monoxide to act on calcium hydroxide at formate producing temperatures and presures in presence of sodium formate.

5. A method of producing calcium formate consisting in causing a gas which comprises carbon monoxide to act on milk of lime at formate producing temperatures and pressures in presence of sodium formate.

6. A method of producing formates of the alkaline earth metals consisting in causing a gas which comprises carbon monoxide to act on an alkaline earth metal hydroxide at formate producing temperatures and pressures in presence of a catalyst consisting of at least one alkali metal formate, said catalyst being produced in situ by having present at least one caustic alkali, which is capable of reacting with carbon monoxide to produce the corresponding alkali metal formates the approximate proportions by weight being 100 parts of said hydroxide to not more than 30 parts of alkali metal formate.

7. A process as claimed in claim 3 in which the chemicals adapted to combine with carbon monoxide to produce the catalyst comprise at least one of the following: alkali metal phenolates, alkali metal acetates, alkali metal oleates, alkali metal chromates, alkali metal carbonates, alkali metal sulphides, alkali metal sulphates, alkali metal alcoholates, alkali metal ferrocyanides, and alkali metal borates.

8. A method of producing formates of the alkaline earth metals consisting in causing a gas which comprises carbon monoxide to act upon an alkaline earth metal hydroxide at formate producing temperatures and pressures in presence of a catalyst, which consists of at least one alkali metal formate, and of a previously prepared saturated aqueous solution of the alkaline earth formate, so that the formate being produced is progressively precipitated out as formed.

9. A method of producing formates of the alkaline earth metals consisting in causing a gas which comprises carbon monoxide to act upon an alkaline earth metal hydroxide at formate producing temperatures and pressures in presence of a catalyst, which consists of at least one alkali metal formate produced in situ by the interaction of carbon monoxide and added alkali metal compounds, and of a previously prepared saturated aqueous solution of the alkaline earth formate, so that the formate being produced is progressively precipitated out as formed.

10. A method of producing formates of the alkaline earth metals consisting in causing a gas which comprises carbon monoxide to act upon solid, alkaline earth metal hydroxide, which has been moistened by means of water vapour, at formate producing temperatures and pressures in presence of a catalyst which consists of at least one alkali metal formate.

11. A method of producing formates of the alkaline earth metals consisting in causing a gas which comprises carbon monoxide to act upon solid, alkaline earth metal hydroxide, which has been moistened by means of water vapour, at formate producing temperatures and pressure in presence of a catalyst which consists of at least one alkali metal produced in situ.

12. A method of producing formates of the alkaline earth metals consisting in causing a gas which comprises carbon monoxide to act upon solid, alkaline earth metal hydroxide, which has been moistened with a small quantity of steam, at formate producing temperatures and pressures in presence of a catalyst which consists of at least one alkali metal formate.

13. A method of making calcium formate consisting in slaking burnt lime with water vapour, mixing 100 kg. of the resulting, powdered, calcium hydroxide containing 15% moisture with 15 kg. of sodium formate, and subjecting the mixture to treatment with carbon monoxide at 180° C. and under a pressure of 35 atms.

14. A method of making calcium formate consisting in slaking burnt lime with water vapour, mixing 100 kg. of the resulting, powdered, calcium hydroxide containing 15% moisture with 6 kg. of caustic potash, and subjecting the mixture to treatment with carbon monoxide at 180° C. and under a pressure of 35 atms.

15. A method of making calcium formate consisting in mixing 500 litres of 15% milk of lime with 20 kg. of sodium formate and 50 kg. of calcium formate, subjecting the mixture to carbon monoxide at 180° C. and under a pressure of 4 atms., and filtering off the resulting calcium formate.

EGON ELÖD.
MAX ENDERLI.